United States Patent [19]

Saito et al.

[11] Patent Number: 4,758,771
[45] Date of Patent: Jul. 19, 1988

[54] APPARATUS FOR DRIVING AC MOTOR

[75] Inventors: Suzuo Saito, Higashi; Yasuhiro Ando, Hachioji, both of Japan

[73] Assignee: Kabushiki Kaisha Toshiba, Kanagawa, Japan

[21] Appl. No.: 924,414

[22] Filed: Oct. 29, 1986

[30] Foreign Application Priority Data

Oct. 30, 1985 [JP] Japan .................. 60-241354

[51] Int. Cl.$^4$ ............................. H02P 7/36
[52] U.S. Cl. ................... 318/729; 318/807; 318/427; 318/800; 363/37; 363/64
[58] Field of Search ............... 307/43, 64, 66, 80; 363/37, 64; 323/212, 223, 301, 311, 237; 318/427, 440, 729, 800

[56] References Cited

U.S. PATENT DOCUMENTS

| | | | |
|---|---|---|---|
| 4,249,120 | 2/1981 | Earle | 318/729 |
| 4,409,533 | 10/1983 | Kawabata | 318/440 |
| 4,641,042 | 2/1987 | Miyazawa | 307/43 |

FOREIGN PATENT DOCUMENTS

| | | | |
|---|---|---|---|
| 58-18865 | 4/1983 | Japan | 318/729 |
| 58-26278 | 6/1983 | Japan | 318/729 |

*Primary Examiner*—William M. Shoop, Jr.
*Assistant Examiner*—Brian Young
*Attorney, Agent, or Firm*—Foley & Lardner, Schwartz, Jeffery, Schwaab, Mack, Blumenthal & Evans

[57] ABSTRACT

This invention relates to an apparatus for driving an ac motor that includes a current controlled type power converter which produces an ac current or power having an arbitrary frequency at its output, a first switch provided to connect the power converter and the ac motor, and a second switch provided to connect an independent ac power supply and the ac motor. The apparatus operates in two switching modes, namely, switching from the ac power supply to the power converter and switching from the power converter to the ac power supply. To perform such a switching operation smoothly, the apparatus of the invention a voltage phase detector circuit for detecting the voltage phase of the ac power supply, detector circuit for detecting a value proportional to the power factor of the ac motor, a holding circuit for holding the value proportional to the power factor for a predetermined time, a current phase detector for detecting the current phase of the ac motor on the basis of the voltage phase of the ac power supply and the value proportional to the power factor, and a switching circuit for causing the first and second switches to be operative in synchronism with the phase detection signal.

7 Claims, 4 Drawing Sheets

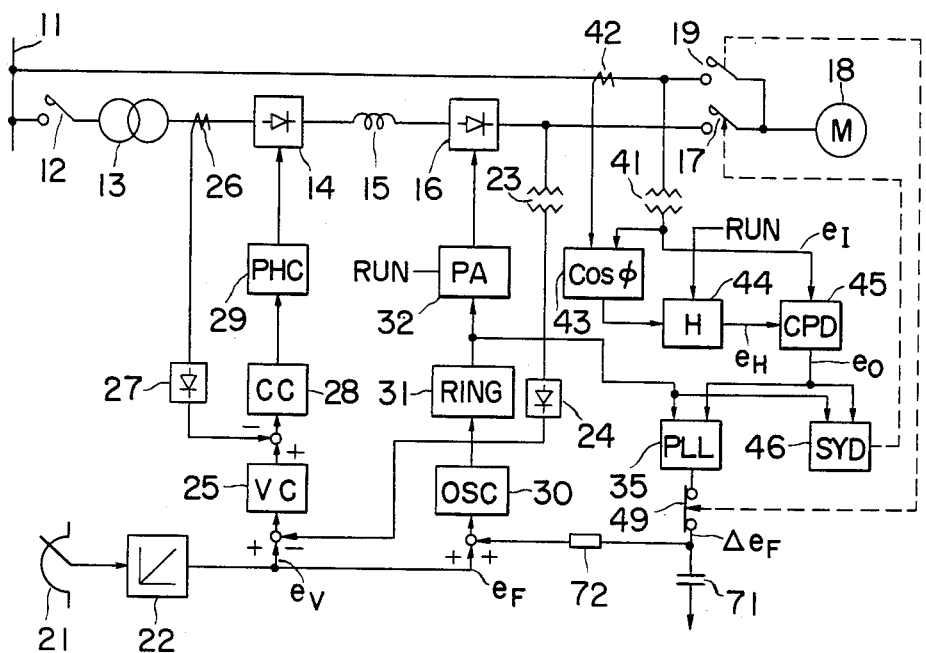
F I G. 1
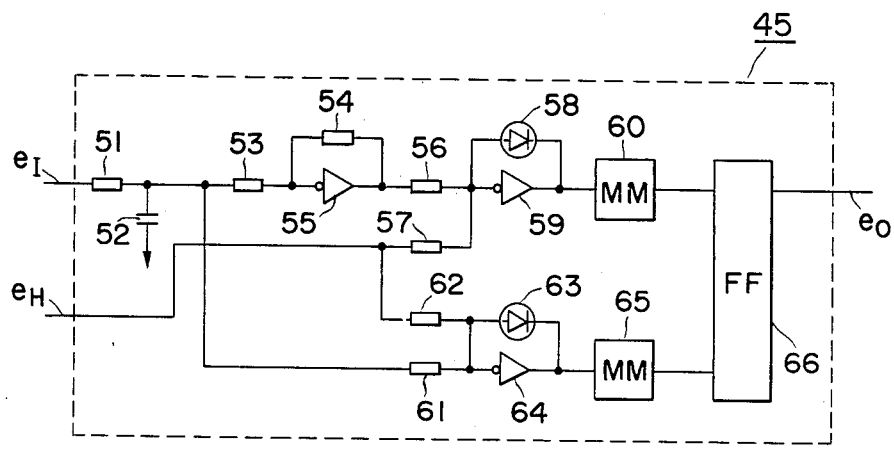
F I G. 2

APPARATUS FOR DRIVING AC MOTOR

BACKGROUND OF THE INVENTION

The present invention relates to an apparatus for driving an ac motor which runs by switching the ac motor driven by an independent ac power supply to the side of a current controlled type power converter which produces an ac current or power having an arbitrary frequency as its output.

For apparatus widely used in general as current controlled type power converters to which the present invention is applied, current type inverters or thyristor motors etc. are known. By giving an example of the current type inverter as the current controlled type power converter, the following discussion will proceed. In addition, induction motors and synchronous motors etc. are applicable to the ac motor. In the following discussion, explanation will be made by giving an example of the induction motor as the ac motor.

Induction motors are driven in accordance with various running systems using various power supplies depending upon their applications. For instance, when applied to a fan or blower etc., there are many instances where the induction motor runs at a constant speed using a commercial power supply. In an attempt to perform a flow rate control in such a system, control using a damper etc. has been generally conducted. To the contrary, there have been recently increased applications to effect an adjustable speed control using the current type inverter, thereby to perform the flow rate control. In accordance with this method, when it is required to cause the flow rate to be maximum, running is carried out by directly using the commercial power supply without connecting the current type inverter to the system, resulting in extremely high reliability and good efficiency. On the other hand, when the flow rate is required to be reduced, since the induction motor is driven through the current type inverter using a running frequency caused to be reduced due to the connection of the inverter to the system, such a control advantageously provides that running with a high efficiency and a saving in energy is possible when compared to the above-mentioned damper control.

In FIG. 5, the above-mentioned control system is shown. A commercial power supply 11 is connected to a current controlled inverter through a switch 12 and a transformer 13. The current type inverter is composed of a rectifying circuit 14 which converts ac to dc current or power, a dc reactor 15 which smooths the dc current from the circuit 14, and an inverter circuit 16 which converts dc to ac current or power having an arbitrary frequency. The output of the current type inverter is connected to an induction motor 18 through a switch 17. The commercial power supply 11 is also connected via a different route directly to the induction motor 18 through a switch 19. The current type inverter operates as will be described below. Namely, a speed reference given by a setter 21 serves as a voltage reference $e_v$ and a frequency reference $e_f$ through an input limiter 22. The voltage reference $e_v$ and a voltage feedback signal obtained through a volatage transformer 23 and a rectifier 24 are subjected to comparative amplification at a voltage control circuit (VC) 25 to produce a current reference. This current reference and a current feedback signal obtained through a current transformer 26 and a rectifier 27 are subjected to comparative amplification at a current control circuit (CC) 28 to produce a phase reference. This phase reference gives a firing pulse of thyristors constituting the rectifying circuit 14 through a phase control circuit (PHC) 29. On the other hand, the frequency reference $e_f$ gives a firing timing of thyristors constituting the inverter circuit 16 through an oscillator (OSC) 30 and a ring counter (RING) 31. A pulse amplifier circuit (PA) 32 between the ring counter 31 and the inverter circuit 16 has a function to amplify the firing pulse, and a function to determine whether or not a pluse is delivered to the thyristors constituting the inverter circuit 16 in accordance with a running singal RUN externally delivered. Switching from the drive by the commercial power supply to the drive by the current type inverter is carried out as follows. Until such a switching is effected, the switch 19 is closed, and the phase of a current supplied from the commercial power supply is detected by a current transformer 33 and a current detection circuit (CD) 34. The reason why the detection of the current phase is carried out is that the power converter to be switched is of the current type and therefore the factor which can be directly controlled is the current phase. The current phase output from the current detection crcuit 34 and the firing timing output from the ring counter 31 are subjected to comparative amplificaiton in terms of phase at a phase comparator (PLL) 35. Thus, the phase comparator 35 produces to the oscillator 30 a frequency correction signal $\Delta e_f$ for allowing both frequencies and phases to be equal to each other. In a manner stated above, before the running signal RUN is input, the current type inverter is caused to be in phase with the side of the commercial power supply, thereafter to initiate running of the current type inverter. In addition, outputs from the current detection circuit 34 and the ring counter 31 are delivered to a synchronization detector (SYD) 46, and the output of the SYD 46 is used for control of the operation of the switch 17.

The operation of the synchronization detector 46 shown in FIG. 5 will now be described with reference to FIG. 7. When an output signal $e_a$ of the current detection circuit 34 is input to the synchronization detector 46, a monomultivibrator 46a responds to this signal $e_a$ to produce a predetermined pulse signal which is input to an AND gate 46c. Likewise, when an output signal $e_b$ of the ring counter 31 is input to the synchronization detector 46, another monomultivibrator 46b responds to this signal $e_b$ to produce a predetermined pulse signal which is input to the AND gate 46c. When the AND condition on both pulse signals holds at the AND circuit 46c, this circuit 46c produces an input signal to a counter circuit 46d. When such signals are successively input to the counter circuit 46d by a predetermined number, the counter circuit 46d outputs a synchronization detection signal. In contrast, when such signals are not successively input, a counter 46e responds to the number of pulse signals output from the monomultivibrator 46a to produce an input signal to an AND circuit 46f. A signal obtained by inverting an output signal from the counter circuit 46d using a NOT circuit 46g is also input to the AND circuit 46f. At this time, if the counter circuit 46d does not effect synchronization detection, the counter circuit 46d and the counter 46e are both reset.

FIG. 6 illustrates an example of a main circuit configuration of the current type inverter. The rectifying circuit 14 is composed of six thyristors. In addition, the inverter circuit 16 is composed of six thyristors, six diodes and six commutation capacitors. Since the detailed operation thereof is not significant for the subject matter of the present invention, the explanation thereof will be omitted. It is to be noted that the detailed operation is described, for example, in "Running and maintenance of thyristor controlled ac motor" by Naohiko Yamagami (published by Denki Shoin, Oct. 29, 1977).

In accordance with the conventional power supply switching system shown in FIG. 5, while the system is subject to switchover running, i.e., when the switches 19 and 17 are closed at the same time, the current phase on the side of the commercial power supply which serves as reference shifts so as to correct the phase of the current from the current type inverter side. Thus, the drawback with this conventional system is that the reference phase is not fixed, resulting in unstable switchover running. In addition, two or three current transformers are required for accurately detecting the current phase on the side of the commercial power supply. Thus, further drawback is that when applied to the high voltage system, the entirety of the system becomes costly because the transformer for high voltage is expensive.

SUMMARY OF THE INVENTION

An object of the present invention is to provide a high reliability apparatus for driving an ac motor which can maintain the current phase serving as reference even during switchover running.

Another object of the present invention is to provide a low cost apparatus for driving an ac motor which can perform switching operation using a transformer and a detection circuit comprising at least one current transformer.

The present invention contemplates obtaining the current phase on the side of the commercial power supply which serves as reference by detecting the voltage phase which is not affected by the connection of the power converter to the system using a voltage transformer without using an instantaneous current and a plurality of current transformers which are likely to be affected by the same, and effecting conversion from the voltage phase to to the current phase on the basis of a value proportional to a power factor obtained through a signal current transformer at the minimum. Accordingly, by holding the value proportional to the power factor, it is possible to attain holding of the current phase which serves as reference even during switchover running.

BRIEF DESCRIPTION OF THE DRAWINGS

In the accompanying drawings:

FIG. 1 is a block diagram illustrating an embodiment of the present invention;

FIG. 2 is a circuit diagram illustrating the detail of a current phase calculation circuit 45 shown in FIG. 1;

DETAILED DESCRIPTION OF THE PREFERRED EMBODIMENTS

Figure 5:
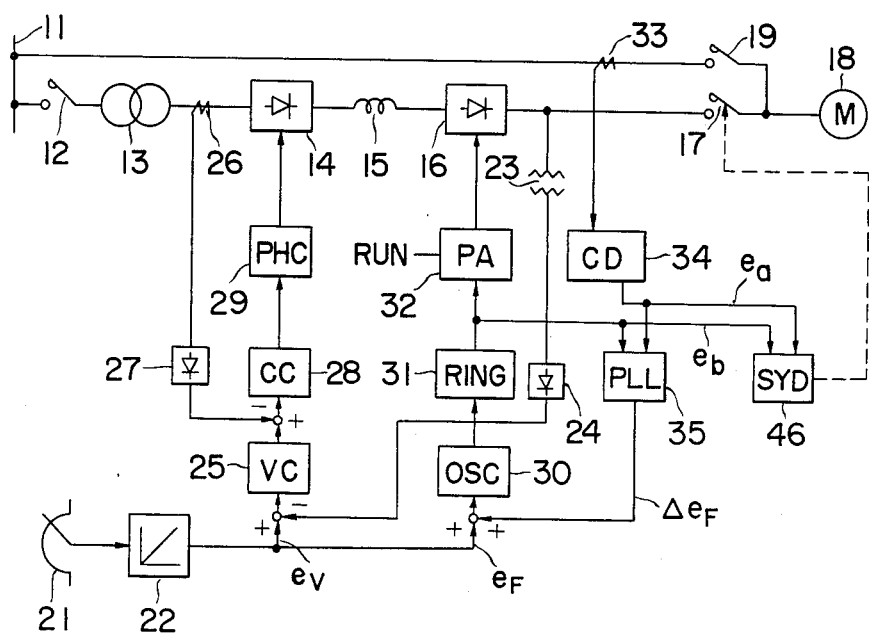
FIG. 5 is a block diagram illustrating an example of a circuit configuration of a conventional apparatus.
Figure 6:
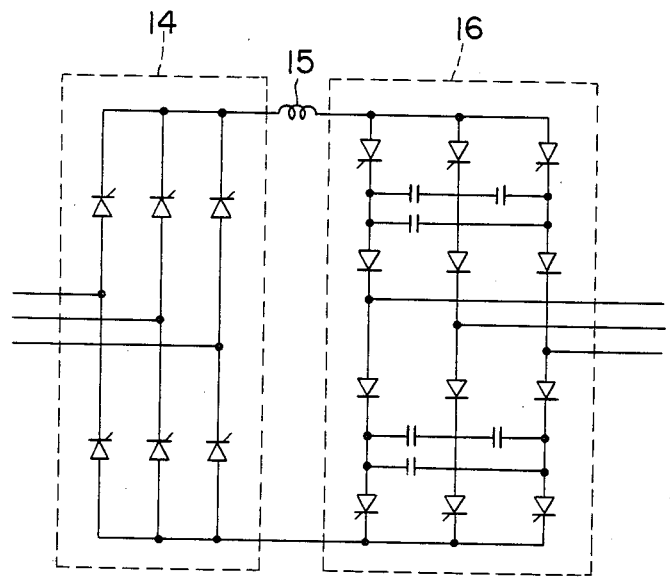
FIG. 6 shows an example of a circuit arrangement of the main circuit of a current type inverter.
Figure 7:
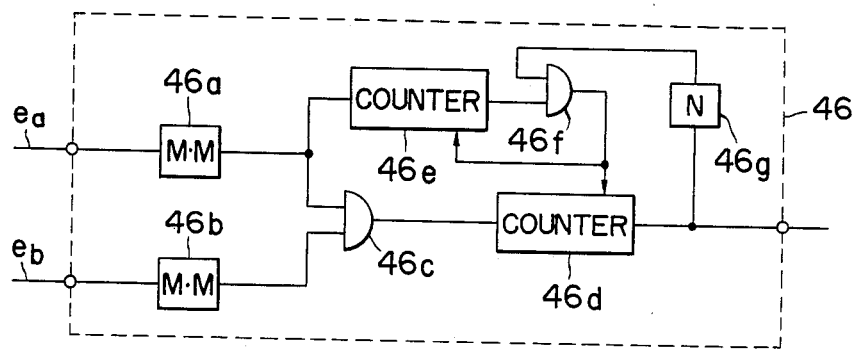
FIG. 7 is a circuit diagram showing the detail of a synchronization detector 46 used in the conventional apparatus and in the apparatus according to the present invention.

Initially, referring to FIG. 1, there is shown a first embodiment of an apparatus for driving an ac motor according to the present invention. The apparatus in the first embodiment differs from the prior art apparatus shown in FIG. 5 in connection with the following two points. First point is to detect the voltage phase using a voltage transformer 41 instead of the current transformer 33 and the current detection circuit (CD) shown in FIG. 5 to detect a value proportional to the power factor at a power factor detection circuit (cos Φ) 43 to which an output signal from the voltage transformer 41 and a current detection signal from the current transformer 42 are input. Second point is to hold an output signal from the power factor detection circuit 43 at a hold circuit (H) 44 to calculate a current phase from the value held in proportion to the above-mentioned voltage phase and power factor at a current phase calculation circuit (CPD) 45, thus to output a signal to the phase comparator (PLL) 35. Since the hold circuit 44 is configured so that the running signal RUN is also input thereto, when no running signal RUN is input, the hold circuit 44 produces an output signal of which value is equal to the input signal, while when running signal is input, it holds the output signal at that time.

An example of the detailed configuration of the current phase calculation circuit (CPD) 45 is shown in FIG. 2. When an output signal $e_o$ of the current phase calculation circuit 45 is a current phase reference of R-phase, a voltage phase signal $e_I$ input to the current phase calculation circuit 45 takes voltage reference of T-phase. A filter circuit comprising a resistor 51 and a capacitor 52 lags the signal phase by 30 degrees. This signal is inverted by passing it through a circuit including resistors 53 and 54, and an operational amplifier 55. The inverted signal is delivered to a comparison circuit including input resistors 56 and 57, and an operational amplifier 59 of which output is limited by a Zener diode 58. Namely, the inverted signal delivered through the resistor 56 is compared with a signal $e_H$ held in proportion to the power factor which is delivered through the resistor 57 in accordance with the comparison effect of the comparison circuit. The signal indicative of the compared result from the operational amplifier 59 is delivered to a single pulse oscillator (MM) 60 which outputs one pulse in response to its fall. Similarly, the output signal of the filter circuit is compared with the signal $e_H$ with it not being inverted at a comparator including resistors 61 and 62, a Zener diode 63, and an operational amplifier 64. The signal indicative of the compared result is delivered to a single pulse oscillator (MM) 65. These output signals from the single pulse oscillators 60 and 65 are input to a flip-flop (FF) 66. Thus, the output of the flip-flop 66 serves as the signal $e_o$ of the current phase reference of the R-phase.

Figure 3:
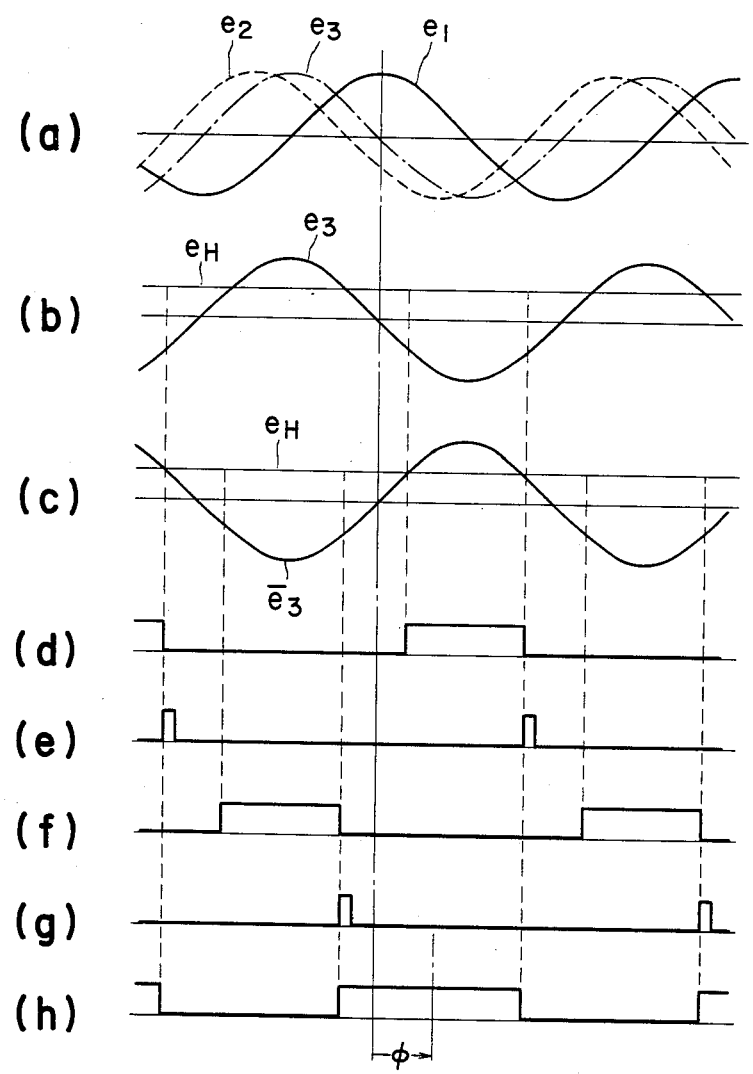
FIG. 3 is a timing chart for explaining the operation of the circuit shown in FIG. 2.

The principle of the operation of this embodiment will be referrred to in conjunction with the timing chart shown in FIG. 3. FIG. 3(a) shows the relationship of the ac voltage phase wherein $e_1$ is a R-phase voltage signal, $e_2$ a T-phase voltage signal, and $e_3$ a voltage signal which lags $e_2$ by a phase angle of 30 degrees. FIG. 3(b) shows the comparison between the signals $e_3$ and $e_H$. FIG. 3(d) shows a comparator output, and FIG. 3(e) a single pulse oscillator output. In addition, FIG. 3(c) shows the comparison between signals $\bar{e}_3$ and $e_H$, FIG. 3(f) a comparator output, and FIG. 3(g) a single pulse oscillator output. FIG. 3(h) shows an output of the flip-flop circuit. When the signal $e_H$ is selected to be equal to a gain such that when the power factor of the induction motor 18 is 1, the signal $e_H$ is equal to the peak value of the signal $e_3$, and when the power factor is 0, the signal $e_H$ is equal to zero, it is apparent that the output signal $e_o$ of the flip-flop circuit shifts by the power factor angle Q with respect to the R-phase voltage $e_1$.

The operation shown in FIG. 1 will now be described as follows.

The phase comparator 35 compares a current phase reference signal $e_o$ which is an output signal of the current phase calculation circuit 45 with an output signal of the ring counter 31 to perform comparative calculation of a frequency correction signal $\Delta e_f$ proportional to the phase difference therebetween. Thus, the phase comparator 35 corrects the output signal of the ring counter 31 using the frequency correction signal $\Delta e_f$ to effect a control such that phases of the above-mentioned phase reference signal $e_o$ and the output signal of the ring counter 31 are always synchronized with each other. The synchronization detector 46 monitors the phase difference between the output signal $e_o$ of the current phase calculation circuit 45 and the output signal of the ring counter 31. When this detector 46 detects that phases of the both signals are synchronized with each other, it outputs a signal for closing the switch 17. When the switch 17 is closed, the running signal RUN is input, and the hold circuit 44 holds an output signal of the power factor detection circuit 43. In addition, the pulse amplifier circuit 32 responds to an output signal from the ring counter 31 to output a thyristor gate pulse synchronized with the above-mentioned current phase reference signal $e_o$ to the inverter circuit 16. Thus, the inverter circuit 16 begins allowing a current to flow, the current having the same phase as that of a current which has been delivered from the commercial power supply 11 to the induction motor. At this time, by opening the switch 19, power supply switching is completed. In cooperation with the opening operation of the switch 19, a normally closed switch 49 is opened, so that the frequency correction signal $\Delta e_f$ becomes zero after a time based on the discharging time constant determined by a capacitor 71 and a resistor 72 has passed. Thus, the inverter circuit 16 effects an accelerating and decelerating running using a frequency given by the setter 21.

Figure 4:
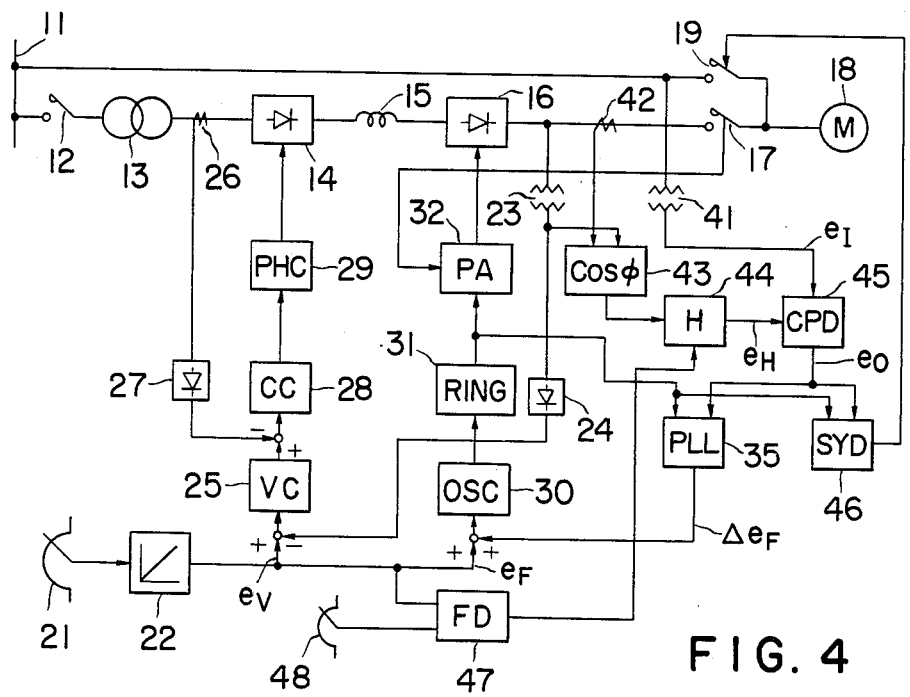
FIG. 4 is a block diagram illustrating another embodiment of the present invention.

FIG. 4 is a block diagram illustrating another embodiment of the present invention. This embodiment differs from the first-mentioned embodiment in connection with the following points. The voltage transformer 42 is provided on the output side of the inverter circuit 16, and an output signal of the voltage transformer 23 is used for an input signal (voltage signal) of the power factor detection circuit 43. To the hold circuit 44, an output signal of a frequency detector 47 is delivered. By allowing the switch 19 to be closed using an output signal from the synchronization detector 46 and by allowing the operation of the pulse amplifier circuit 32 to be stopped using a signal indicating that the switch 17 has been opened, the inverter running is stopped. In addition, the above-mentioned frequency detector 47 detects that an inverter output frequency reference set at the setter 21 is above a predetermined value set at a setter 48. Other operations are the same as in the embodiment shown in FIG. 1.

As described above, the present invention is implemented so that the current phase on the commercial power supply side which serves as reference is obtained on the basis of the voltage phase which is not affected by the connection of the power converter to the system and a value proportional to the power factor immediately before switching. In addition, the present invention is implemented so as to hold this value proportional to the current phase which serves as reference. Thus, since such an implementation permits holding the current phase which serves as reference, the present invention can provide an apparatus for driving an ac motor having the following features.

(1) Since it is possible to hold the current phase which serves as reference even during switchover running, this apparatus can perform stable switchover running, resulting in high reliability.

(2) Since only the provision of a voltage transformer and at least one current transformer permits stable switchover running, this apparatus can be of the low cost type.

It has been described in the above-mentioned embodiments that the commercial power supply is used as an ac power supply independent of the power converter. However, it is apparent that, for example, even if a power supply constituted with another power converter is used, such an implementation does not deviate from the subject matter of the invention.

What is claimed is:

1. In an apparatus for driving an ac motor comprising:
    a current controlled type power converter which produces an ac current or power having an arbitrary frequency as its output;
    a first switch provided to connect said power converter to said ac motor, and a second switch provided to connect an independent ac power supply to said ac motor;
    first means for detecting a voltage phase of said ac power supply;
    second means for detecting a value proportional to the power factor of said ac power supply;
    third means for holding an output signal from said second means at a preselected time from a period while said motor is driven by said ac power supply, until said ac motor is switched to said power converter;
    fourth means for calculating a current phase of said ac motor on the basis of output signals from said first and third means; and
    fifth means for instructing said power converter to run and for instructing said first and second switches to be operative in synchronism with a phase detection signal from said fourth means wherein said ac motor is switched from said ac power supply to said power converter.

2. An apparatus as set forth in claim 1, wherein said fourth means forms a current reference of the phase to be output using a voltage reference of any other phase and an output of said third means.

3. An apparatus as set forth in claim 2, wherein said fourth means comprises:
    a first circuit for delaying said voltage reference of any other phase by 30 degrees;
    a second circuit provided with a terminal for taking out an output from said first circuit as it is, and another terminal for taking out an output obtained by inverting said output from said first circuit to form a pair of antiphase signals;

a third circuit which individually compares said pair of antiphase signals with said output from said third means to output a set of compared results;

a pair of single pulse oscillators responsive to respective falls of said set of compared results to produce output pulse signals; and a flip-flop response to said respective output pulse signals to output said current reference.

4. In an apparatus for driving an ac motor comprising:

a current controlled type power converter which produces an ac current or power having an arbitrary frequency as its output;

a first switch provided to connect said power converter to said ac motor, and a second switch provided to connect an independent ac power supply and said ac motor;

first means for detecting a voltage phase of said ac power supply;

second means for detecting a value proportional to the power factor of said ac motor;

third means for holding an output signal from said second means at a preselected time from a period while said motor is driven by said power converter, until said ac motor is switched to said ac power supply;

fourth means for calculating a current phase of said ac motor on the basis of output signals from said first and third means; and fifth means for outputting an operating instruction to said first and second switches in synchronism with a phase detection signal from said fourth means, wherein said ac motor is switched from said power converter to said ac power supply.

5. An apparatus as set forth in claim 4, wherein said fourth means forms a current reference of the phase to be output using a voltage reference of any other phase and an output of said third means.

6. An apparatus as set forth in claim 5, wherein said fourth means comprises:

a first circuit for delaying said voltage reference of any other phase by 30 degrees;

a second circuit provided with a terminal for taking out an output from said first circuit as it is, and another terminal for taking out an output obtained by inverting said output from said first circuit to form a pair of antiphase signals;

a third circuit which indivisually compares said pair of antiphase signals with said output from said third means to output a set of compared results;

a pair of single pulse oscillators responsive to respective falls of said set of compared results to produce output pulse signals; and a flip-flop responsive to said respective output pulse signals to output said current reference.

7. A method of operating an apparatus for driving an ac motor, said apparatus including a current control type power converter which produces an ac current or power having arbitrary frequency as its output, the first switch provided to connect said power converter to said ac motor, and a second switch provided to connect an independent ac power supply to said ac motor, said method comprising the steps of:

detecting a voltage phase of said ac power supply with a voltage phase detection circuit;

detecting a value proportional to the power factor of said ac power supply with a detector circuit;

holding the value detected by said detector circuit at a preselected time from a period while said motor is driven by said ac power supply until said ac motor is switched to said power converter in a holding circuit;

calculating a current phase of the ac motor on the basis of a voltage phase detected by said voltage phase detecting circuit and the value held by said holding circuit; and controlling said power converter to operate and controlling said first and second switches to be operative in synchronism based on the calculated current phase, wherein said ac motor is switched from said ac power supply to said power converter.

* * * * *